J. H. GRUNDY & T. H. CARTER.
FEED-TROUGH.

No. 184,076. Patented Nov. 7, 1876.

WITNESSES:
Francis McArdle,
John Goethals

INVENTOR:
J. H. Grundy
T. H. Carter
BY
ATTORNEYS.

UNITED STATES PATENT OFFICE.

JAMES H. GRUNDY AND THOMAS H. CARTER, OF BREMEN, KENTUCKY.

IMPROVEMENT IN FEED-TROUGHS.

Specification forming part of Letters Patent No. 184,076, dated November 7, 1876; application filed September 30, 1876.

*To all whom it may concern:*

Figure 1:
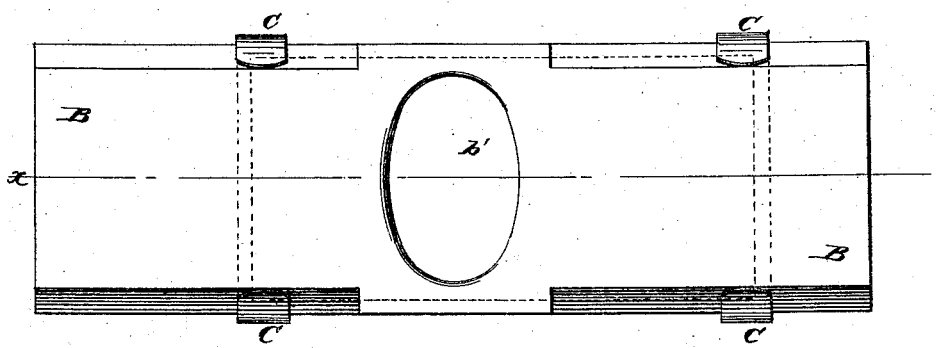
Figure 2:
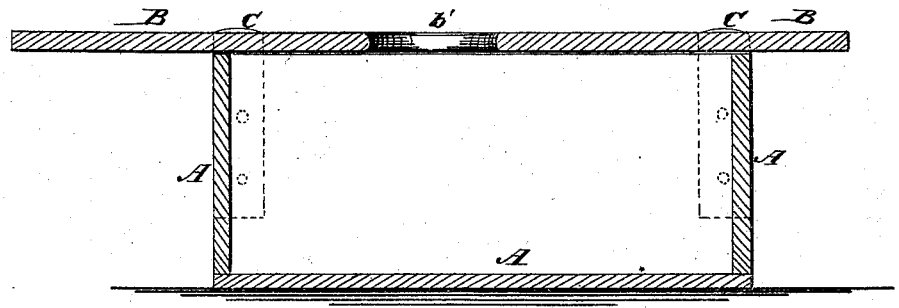

Be it known that we, JAMES H. GRUNDY and THOMAS H. CARTER, of Bremen, in the county of Muhlenburg and State of Kentucky, have invented a new and useful Improvement in Feed-Trough, of which the following is a specification:

Figure 1 is a top view of our improved feed-trough. Fig. 2 is a vertical longitudinal section of the same taken through the line $x\ x$, Fig. 1.

Similar letters of reference indicate corresponding parts.

The object of this invention is to furnish improved troughs for feeding horses and other stock, which shall be so constructed as to prevent fowls or other animals than those being fed from having access to the grain, and to prevent the animals being fed from wasting their food by throwing it out of the trough.

The invention consists in a feed-trough provided with a cover sliding longitudinally upon said trough, and having a hole formed through it to receive the animal's nose, and provided with suitable stops to limit its movements, as hereinafter fully described.

A represents an ordinary trough, which may be made short to adapt it for use in feeding a single animal; or it may be made longer and divided into compartments by cross-partitions to adapt it for use in feeding several animals at a time. Upon the top of the trough A is placed a cover, B, which has a hole, $b'$, formed through it of sufficient size to receive the nose of the horse or other animal to be fed.

When the trough A is short, a single hole, $b'$, is formed in the cover B; but when the trough A is made long, the cover B should have a hole, $b'$, for each compartment.

The cover B slides upon the top of the trough A for such a distance as will allow the animal to move his nose from one end of the trough or compartment to the other, so that he can eat all the feed put into the trough. The movement of the cover B upon the trough A is limited by straps C, attached to the trough A, and having their upper ends bent inward to fit upon the beveled edges of the cover B, so as to limit the movement of said cover by striking against the shoulders at the inner ends of said bevels; or the cover B may slide in grooves in the sides of the trough A, and may have its movements limited by cleats attached to its lower side, or any other convenient stops may be used.

Having thus described our invention, we claim as new and desire to secure by Letters Patent—

A feed-trough, A, provided with a cover, B, sliding longitudinally upon said trough, and having a hole formed through it to receive the animal's nose, and provided with suitable stops to limit its movements, substantially as herein shown and described.

JAMES HARVY GRUNDY.
THOMAS HUGH CARTER.

Witnesses:
SAMUEL O. GRUNDY,
JACOB WRIGHT.